US011935446B2

(12) United States Patent
Guzel et al.

(10) Patent No.: US 11,935,446 B2
(45) Date of Patent: Mar. 19, 2024

(54) ROLL-UP FLEXIBLE DISPLAY

(71) Applicant: INFINIA MUHENDISLIK LTD. STI., Ankara (TR)

(72) Inventors: Ismail Tugay Guzel, Ankara (TR); Kadem Berker Yasar, Ankara (TR)

(73) Assignee: INFINIA MUHENDISLIK LTD. STI., Ankara (TR)

( * ) Notice: Subject to any disclaimer, the term of this patent is extended or adjusted under 35 U.S.C. 154(b) by 0 days.

(21) Appl. No.: 17/789,625

(22) PCT Filed: Dec. 28, 2020

(86) PCT No.: PCT/TR2020/051414

§ 371 (c)(1),
(2) Date: Jun. 28, 2022

(87) PCT Pub. No.: WO2021/137828

PCT Pub. Date: Jul. 8, 2021

(65) Prior Publication Data

US 2023/0050312 A1 Feb. 16, 2023

(30) Foreign Application Priority Data

Dec. 30, 2019 (TR) ................................ 2019/22576

(51) Int. Cl.

| | |
|---|---|
| ***G09G 3/20*** | (2006.01) |
| ***G09F 9/30*** | (2006.01) |
| ***G09G 3/00*** | (2006.01) |
| ***G09G 3/32*** | (2016.01) |

(52) U.S. Cl.

CPC ............. *G09G 3/035* (2020.08); *G09F 9/301* (2013.01); *G09G 3/32* (2013.01); *G09G 2330/04* (2013.01)

(58) Field of Classification Search

CPC ................. G06F 1/1624; G06F 1/1652; G06F 2203/04102; G09G 3/035; G09G 2380/02; G09F 9/301

See application file for complete search history.

(56) References Cited

U.S. PATENT DOCUMENTS

| | | | | |
|---|---|---|---|---|
| 10,410,549 | B1 * | 9/2019 | Kim | G09F 11/02 |
| 10,534,402 | B1 * | 1/2020 | Kim | H05K 1/118 |
| 10,976,778 | B2 * | 4/2021 | Pyo | H05K 5/0217 |

(Continued)

FOREIGN PATENT DOCUMENTS

| | | | |
|---|---|---|---|
| CN | 205122115 U | | 3/2016 |
| CN | 110189594 A | * | 8/2019 |

(Continued)

OTHER PUBLICATIONS

International Search Report of Application No. PCT/TR2020/051414 dated Aug. 8, 2021.

(Continued)

*Primary Examiner* — Joe H Cheng
(74) *Attorney, Agent, or Firm* — Ladas & Parry LLP

(57) ABSTRACT

The present invention relates to a flexible display which uses flexible LED display technology, can be used in indoors, and is designed in the form of a roll-up. The present invention particularly relates to a flexible display and a rotating mechanism thereof which comprise a display wherein addressable LEDs are used and thus enable to eliminate the need for use of a plurality of components.

6 Claims, 4 Drawing Sheets

(56) References Cited

U.S. PATENT DOCUMENTS

| | | | | |
|---|---|---|---|---|
| 11,423,811 | B2 * | 8/2022 | Choi | G06F 1/1652 |
| 2012/0002357 | A1 * | 1/2012 | Auld | G09F 15/0062 361/679.01 |
| 2015/0035437 | A1 * | 2/2015 | Panopoulos | B60L 53/12 315/291 |
| 2016/0154170 | A1 | 6/2016 | Thompson et al. | |
| 2016/0363960 | A1 * | 12/2016 | Park | G09F 15/0062 |
| 2017/0013726 | A1 * | 1/2017 | Han | H05K 7/1427 |
| 2018/0070466 | A1 * | 3/2018 | Kim | H04N 5/655 |
| 2019/0098776 | A1 | 3/2019 | Jeon | |
| 2020/0004296 | A1 * | 1/2020 | Lee | G06F 1/1641 |
| 2020/0035133 | A1 * | 1/2020 | Pyo | F16M 11/2014 |
| 2020/0170114 | A1 * | 5/2020 | Choi | H05K 5/0217 |

FOREIGN PATENT DOCUMENTS

| | | | |
|---|---|---|---|
| CN | 110570755 | A | 12/2019 |
| EP | 2977980 | A1 | 1/2016 |

OTHER PUBLICATIONS

Written Opinion of Application No. PCT/TR2020/051414 dated Aug. 8, 2021.

* cited by examiner

ROLL-UP FLEXIBLE DISPLAY

CROSS-REFERENCE TO RELATED APPLICATIONS

This application is a national stage entry of International Patent Application No. PCT/TR2020/051414 filed on Dec. 28, 2020, which claims priority to Turkish Patent Application No. 2019/22576 filed on Dec. 30, 2019. The aforementioned patent applications are hereby incorporated by reference in their entirety.

TECHNICAL FIELD

The present invention relates to a flexible display which uses flexible LED display technology, can be used in indoors, and is designed in the form of a roll-up.

The present invention particularly relates to a flexible display and a rotating mechanism thereof which comprise a display wherein addressable LEDs are used and thus enable to eliminate the need for use of a plurality of components.

BACKGROUND OF THE INVENTION

Today, numerous imaging devices which can be used in indoors and outdoors in accordance with various purposes such as advertising, promotion, information and guidance are available; and flexible LED displays are one of the most widely used of these display devices. Currently-used flexible LED displays contain many components due to their conventional configuration and hence, a heavy structure with a low-flexibility capability emerges and the rate of error and failure increases depending on the excess number of components included on the display as well. There are many display with these characteristics, but these displays are inserted into a rotating mechanism due to their low flexibility.

Being called as an addressable LED; LED lights are light sources which can be commanded, colored and programmed individually. Each LED can be operated in a different color in addressable LED products within a whole structure containing a plurality of LEDs. Each LED can have a different color and intensity of light. As is the case with standard RGB strip LEDs, these products are also controlled by controller circuits.

As a result of the preliminary examination conducted on the state of the art, the patent file numbered TR2015/09801 was examined. In the abstract part of the invention being subject to the application, information of "the present invention relates to a foldable tactile display and a method of operating it. The foldable tactile display comprises a plurality of actuators, one or more sensors and a computing unit. The computing unit is able to control the plurality of actuators in response to the received command signals and sensor signals, in an embodiment, the tactile foldable display is used in connection with multimedia content. The foldable tactile display may be in the form of a tactile blanket" are included.

As a result of the preliminary examination conducted on the state of the art, the patent file numbered TR2009/07755 was examined. In the abstract part of the invention being subject to the app Ilea Lion, information of the present invention relates to a vinyl foldable LED display. The inventive vinyl foldable LED display is used in private areas, indoors and outdoors in public. The vinyl foldable LED display consist of a vinyl, cloth, tarpaulin, or a similar flexible material whereon a plurality of LEDs are placed; integrated boxes which enable the system operation; and a carcass system for hanging the material with LEDs on it. The inventive product can be easily carried by folding or rolling due to its special flexible structure and it can be conveniently applied in outdoor and indoor advertising areas, even in places (on-wall, building, vehicle and so on) where LED display systems being used today cannot be used" are included.

As a result of the preliminary examination conducted on the state of the art, the patent file numbered TR2009/07755 was examined. The invention being subject to the application discloses a foldable touch screen. A display device is included inside the electronic board being used in the invention, and this display device is coupled with the touch screen. It can be folded between the touch screen and the display device in the form or a roll.

LED displays being used in the state of the art are displays with no flexibility capability due to reasons such as their component densities, printed circuit board (PCB) they use, wiring designs, etc. Whereas displays with flexibility capability have been in television screen format and they are not suitable for outdoor use because they do not have a proper LED usage and design even if they are suitable for indoor use.

Consequently, an improvement is required in the related technical field due to the above-mentioned drawbacks and the incapability of current solutions about the subject.

SUMMARY OF INVENTION

The most important objective of the present invention is to provide screen configuration which has an easy-to-carry display that can be folded cylindrically by means of its lightweight, flexible display technology, and whereby users will not have to get a separate roll-up print each time in order to perform their demonstrations.

Another objective of the present invention is to enable users to show any visual they want on their own displays by means of LED infrastructure.

A further objective of the present invention is to enable users, who do not have to use only one fixed image by means of foldable displays, to have a more effective means of communication also by playing video.

An objective of the present invention is to provide a roll-up display which is developed for the purpose of resolving many problems in the field of both display technologies and advertising.

Another objective of the present invention is to eliminate the need for using a plurality of components for a display structure, by means of creation of a configuration wherein addressable LEDs are used in the display structure. Thereby, the screen achieves a flexible structure.

An objective of the present invention is to ensure that indoor displays of LED lights, which are suitable for physical characteristics of outdoors, fulfill the need for intense pixel by means of a design with an intense pixel rate.

Another objective of the present invention is to ensure that in cases where the display is not used; it can be folded cylindrically, does not take up unnecessary space, and is easy-to-carry by means of the rotating mechanism.

An objective of the present invention is to make an image received from HDMI (High Definition Multimedia Interface) suitable for LED lights upon being processed by FPGA (Field Programmable Gate Array).

A further objective of the present invention is to combine PCB (Printed Circuit Board) with an intense pixel rate and the rotating mechanism.

Structural and characteristic features and all advantages of the invention will be understood by means of the figures provided below, and the detailed description with reference to these figures. Therefore, an evaluation should be made by considering these figures and the detailed description.

REFERENCE NUMBERS

100. Roll-up display
110. Addressable LED
120. Rotating mechanism
121. Mechanism cylinder

DISCLOSURE OF THE INVENTION

The inventive roll-up display (100) is a display configuration which has a lightweight, flexible, cylindrically foldable, easy-to-carry structure; and whereby users will not have to get a separate roll-up print each time for advertising and demonstrations.

The inventive roll-up display (100) consists of a plurality of addressable LEDs (110) and a rotating mechanism (120) for rolling and unrolling these addressable LEDs (110) in general terms.

Figure 2A:
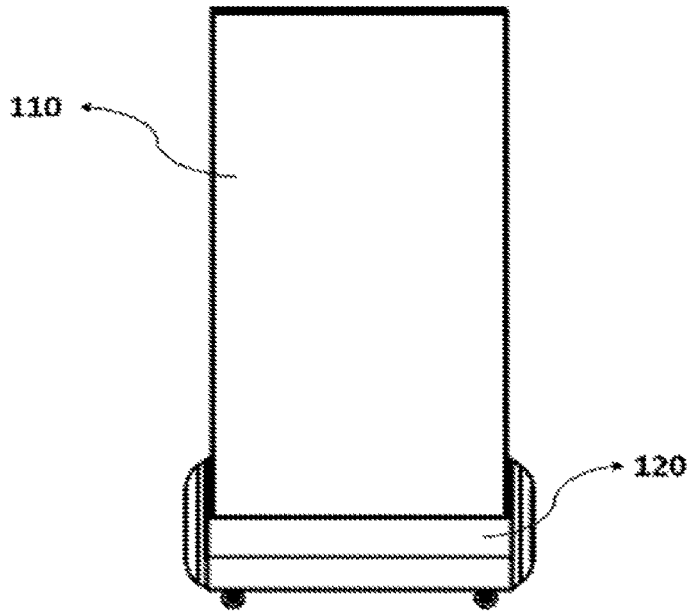
FIG. 2A is a drawing which indicates the front view of the open position of the inventive roll-up LED display.
Figure 2B:
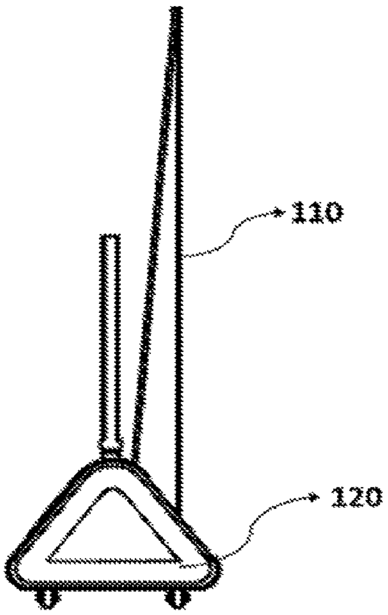
FIG. 2B is a drawing which indicates the side view of the open position of the inventive roll-up LED display.
Figure 3:
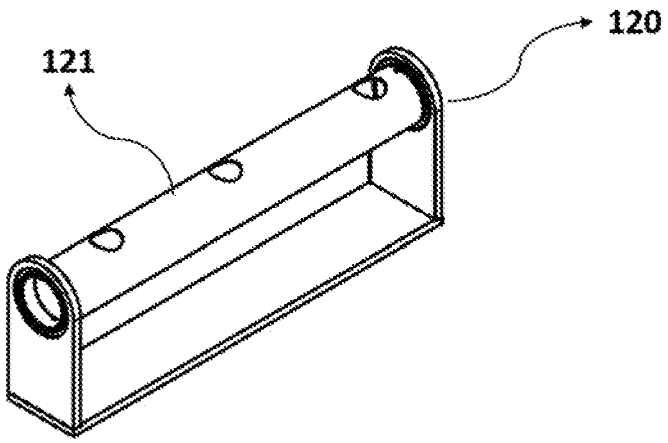
FIG. 3 is a drawing which indicates the perspective view of the rotating mechanism of the inventive roll-up display.
Figure 4:
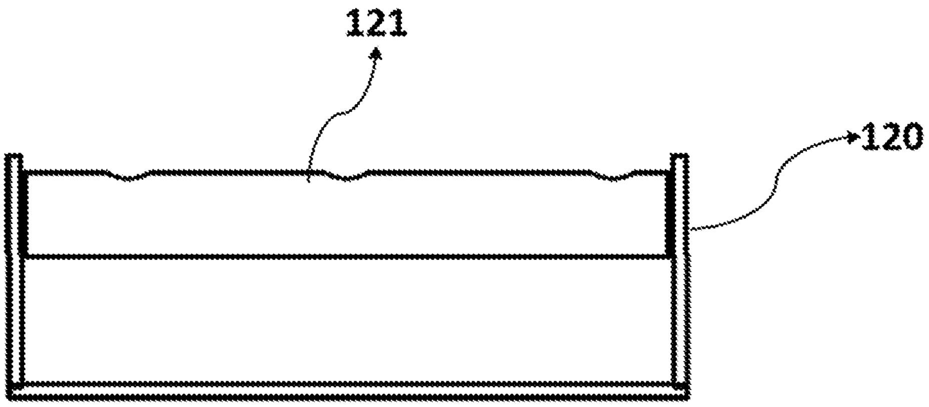
FIG. 4 is a drawing which indicates the front view of the rotating mechanism of the inventive roll-up display.
Figure 5:
FIG. 5 is a drawing which shows an addressable LED.
Figure 6:
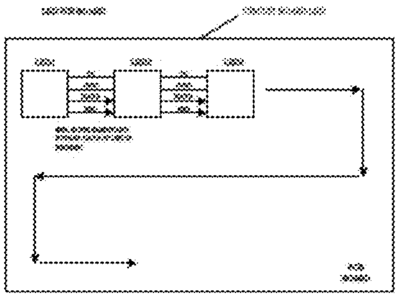
FIG. 6 is a draw ii which shows a circuit board.
Figure 7:
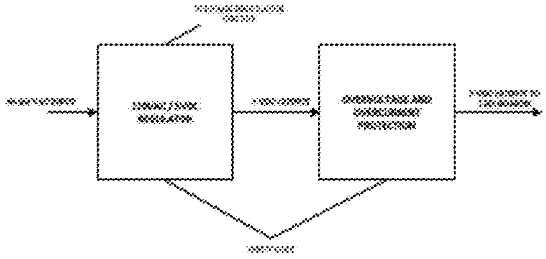
FIG. 7 is a drawing which shows a voltage regulatory circuit.
Figure 8:
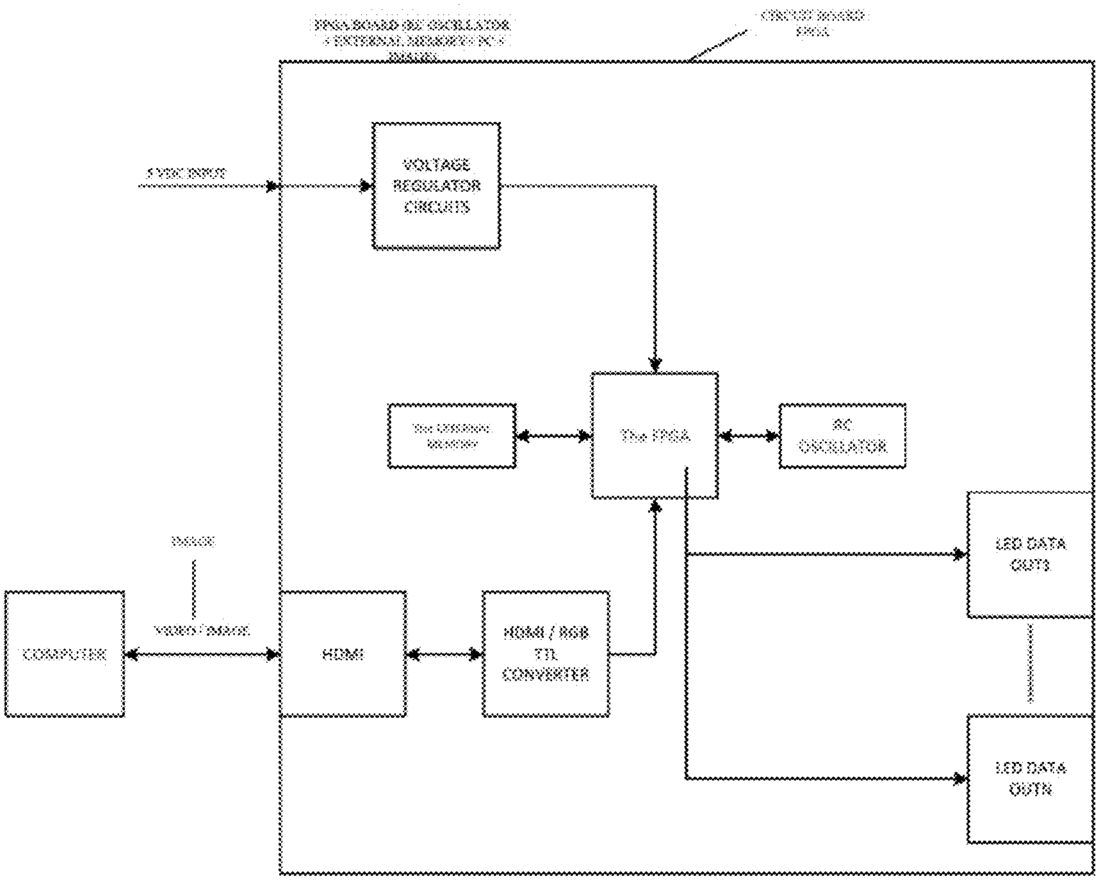
FIG. 8 is a drawing which shows a RC oscillator and FPGA.

The addressable LED (110) creates a surface upon being positioned such that gaps will remain between thereof, and this surface enables display of video and advertising promotion, media received from an input unit. The addressable LEDs (110) have gaps of 4-8 mm between thereof and create a surface upon being positioned preferably side-by-side or one under the other. It is required to show a different color for each addressable LED (110) on the surface shown in the FIG. 2 in order that a requested image can be played on the addressable LEDs (110). In addition, these colors enable to create a motion by moving continuously and thereby it is enabled to create motion images like video. A circuit board is included in the rotating mechanism (120) in order to program each addressable LED (110). Using too much components is not necessary anymore and the display (100) is given flexibility by means of the addressable LEDs (110).

Figure 1:
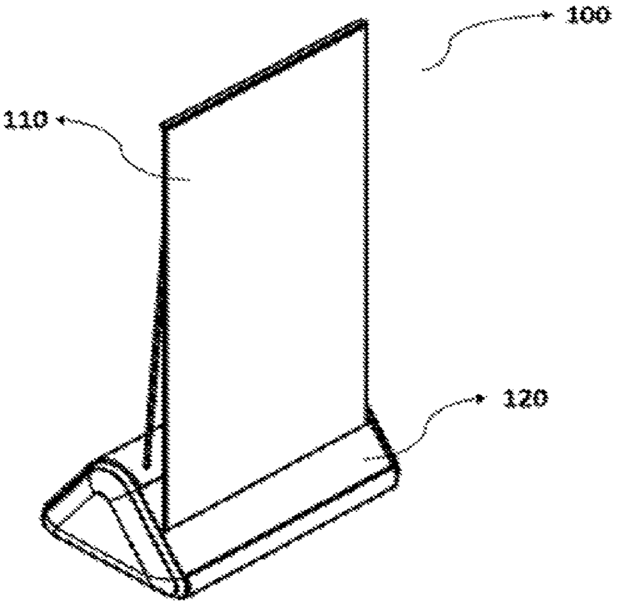
FIG. 1 is a drawing which indicates the perspective view of the open position of the inventive roll-up LED display.

The rotating mechanism (120) can be rolled in cases where the display surface created by the roll-up LEDs (110) are not used. Hence, the surface created by the addressable LEDs (110) are rolled to the mechanism cylinder (121). Thereby, the roll-up display (100) can be rolled and closed inside the rotating mechanism (120), and it can be opened as shown in the FIG. 1. Circuit boards required for operation of the addressable LEDs (110) and other components are included inside the rotating mechanism (120). In addition, voltage regulator circuit and RC oscillator are available inside the rotating mechanism (120).

The voltage regulator enables regulation of the electrical energy voltage given to the roll-up display (100) and thereby, prevents the addressable LEDs (110) from burning and exploding due to high voltage. The RC oscillator enables generation of signal at certain frequencies.

The circuit board enables to send dot data to the addressable LEDs (110) by means of a communication protocol and thus brightness and color information is sent to the related addressable LEDs (110). A serial communication protocol known as I2C (Inter-Integrated Circuit) is used as a communication protocol. It is possible to connect to a computer via an input unit located on the circuit board; and it is enabled to display media in a portable diskette (floppy disk) such as flash disk, external disk on the roll-up display (100). In addition, an image received from HDMI (High Definition Multimedia Interface) is made suitable for the addressable LEDs (110) by this input unit upon being processed by FPGA (Field Programmable Gate Array). This input unit can be all media export inputs such as USB, HDMI, VGA, S-Video and etc. The inventive roll-up display (100) fulfills the need of indoor displays of LEDs (110)—which are suitable for physical characteristics of outdoors—for intense pixel by means of a design with an intense pixel rate. It is ensured that in cases where the display is not used; the mechanism cylinder (121) can be folded cylindrically, does not take up unnecessary space, and is easy-to-carry by means of the rotating mechanism (120).

With the inventive lightweight, flexible roll-up display (100); users will not have to get a separate roll-up print each time in order to perform their demonstrations and they can display any image or media by means of the cylindrically foldable, easy-to-carry display. Besides, users who do not have to use only one fixed image by means of the roll-up display (100) have a more effective means of communication also by playing video.

The invention claimed is:

1. A flexible roll-up display (100) comprising:

a) an addressable LED(s) (110) that enables display of media received from an input unit; the addressable LED creates a surface upon being positioned such that spaces will remain between the more than one addressable LEDs;

b) a rotating mechanism (120) for rolling and unrolling the display surface created by the addressable LED;

c) the rotating mechanism (120) comprising a mechanism cylinder (121) which enables the rolling of the display surface;

d) a circuit board inside the rotating mechanism (120) that enables sending of dot data to the addressable LED (110) by means of a communication protocol; and thus sends brightness and color information to the related addressable LED (110); that enables operation of the addressable LED (110);

e) a voltage regulator circuit and a RC oscillator that enables to make an image, that is received by the input unit located on it, to be made suitable for the addressable LEDs (110) upon being processed by a field programmable gate array (FPGA); and f) the voltage regulator circuit which enables regulation of electrical energy voltage to the roll-up display (100).

2. The roll-up display (100) according to claim 1 wherein the circuit board enables a change colors of the addressable LEDs (110), and ensures that these colors create motion by moving, and thus motion images like video are created.

3. The roll-up display (100) according to claim 1, wherein distance of the spaces between the addressable LEDs (110) is between 4-8 mm.

4. The roll-up display (100) according to claim 1, wherein the surface for displaying the media is created by positioning each one of the addressable LEDs (110) side-by-side or one under the others.

5. The roll-up display (100) according to claim 1, wherein the circuit board is included in the rotating mechanism (120) in order to program each addressable LED (110).

6. The roll-up display (100) according to claim 1, wherein the circuit board can be connected to a computer or an external memory unit by means of the input unit included on thereof, and enables display of media in the computer or the external memory unit on the roll-up display (100).

* * * * *